United States Patent
Touag

(10) Patent No.: US 7,197,015 B2
(45) Date of Patent: Mar. 27, 2007

(54) WIRELESS COMMUNICATION METHOD AND SYSTEM FOR MANAGING THE ASSOCIATION AND DEASSOCIATION OF A WIRELESS TRANSMIT/RECEIVE UNIT

(75) Inventor: Athmane Touag, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/985,499

(22) Filed: Nov. 10, 2004

(65) Prior Publication Data

US 2005/0122919 A1 Jun. 9, 2005

Related U.S. Application Data

(60) Provisional application No. 60/519,119, filed on Nov. 12, 2003.

(51) Int. Cl.
*H04J 3/24* (2006.01)

(52) U.S. Cl. ..................................... 370/312; 370/338

(58) Field of Classification Search ................ 370/338, 370/328, 329, 345, 346, 350, 312, 310, 310.2, 370/349; 455/410, 411, 435.1, 435.3, 456.1, 455/456.2, 435.2
See application file for complete search history.

(56) References Cited

U.S. PATENT DOCUMENTS

| 6,141,533 | A  | * | 10/2000 | Wilson et al. ............. 455/11.1 |
| 2003/0204678 | A1 | * | 10/2003 | Lee ............................. 711/144 |
| 2003/0207702 | A1 | * | 11/2003 | Chen ........................... 455/574 |

FOREIGN PATENT DOCUMENTS

| KR | 1998-47007 | 9/1998 |
| KR | 0192729 | 6/1999 |

* cited by examiner

*Primary Examiner*—Brenda Pham
(74) *Attorney, Agent, or Firm*—Volpe and Koenig, P.C.

(57) ABSTRACT

A method and system for managing association and disassociation of a wireless transmit/receive unit (WTRU) to an access point (AP) in a wireless communication system is disclosed. Once the AP detects that a WTRU is in an inactive state for a predetermined period of time, the AP transmits an association confirmation request message to the WTRU. If the AP receives an acknowledgement (ACK) responsive to the association confirmation request message, the AP maintains the association with the WTRU. If the AP fails to receive an ACK, the AP disassociates the WTRU.

10 Claims, 4 Drawing Sheets

WIRELESS COMMUNICATION METHOD AND SYSTEM FOR MANAGING THE ASSOCIATION AND DEASSOCIATION OF A WIRELESS TRANSMIT/RECEIVE UNIT

CROSS REFERENCE TO RELATED APPLICATION

This application claims the benefit of U.S. Provisional Application No. 60/519,119 filed Nov. 12, 2003 which is incorporated by reference as if fully set forth.

FIELD OF INVENTION

The present invention is related to a wireless communication system. More particularly, the present invention is a method and system for managing the association and disassociation of a wireless transmit/receive unit (WTRU) to/from an access point (AP) in a wireless communication system.

BACKGROUND

A wireless communication system includes a plurality of APs and WTRUs. Each AP usually has a fixed location and has a particular coverage area. The WTRUs are capable of moving around the coverage areas of the APs. When a WTRU first enters a coverage area of a particular AP, the WTRU obtains an association with the particular AP. As the WTRU moves out of the coverage area of the AP, the WTRU obtains a new association with another AP and the association with the particular AP is terminated.

The terminology "disassociation" refers to a procedure of informing an associated AP that a WTRU is no longer connected to the associated AP. A WTRU is disassociated from an AP when the WTRU leaves the coverage area of the AP or when the WTRU is turned off for more efficient management of the system. However, under current IEEE 802.11 standards for a wireless local area network (WLAN), a disassociation procedure is optional. Therefore, a manufacturer may or may not incorporate a disassociation procedure into WTRUs used in a WLAN.

An AP makes real-time decisions when admitting new WTRUs by applying a admission control procedure or by applying radio resource management (RRM) algorithms to solve performance problems. The AP monitors the status of the applied resources as well as WTRUs associated with the AP.

However, under the current IEEE 802.11 standards, it is difficult for an AP to monitor the disassociation of WTRUs. Therefore, the AP does not maintain accurate information regarding the status of resources and WTRU association. As a result, the AP is susceptible to making incorrect decisions related to admission control and RRM. This may affect the performance of the WLAN adversely.

A method and system for enabling an AP to manage the association and disassociation of WTRUs is desired.

SUMMARY

The present invention is a method and system for managing association and disassociation of a WTRU to an AP in a wireless communication system. Once the AP detects that a WTRU is in an inactive state for a predetermined period of time, the AP transmits an association confirmation request message to the WTRU. If the AP receives an acknowledgement (ACK) responsive to the association confirmation request message, the AP maintains the association with the WTRU. If the AP fails to receive an ACK, the AP disassociates the WTRU. The present invention allows an AP to make a call admission control and radio resource management (RRM) decisions more intelligently with accurate information.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Herein, the terminology "WTRU" includes but is not limited to a user equipment, a mobile station, a fixed or mobile subscriber unit, a pager, or any other type of device capable of operating in a wireless environment. When referred to herein, the terminology "AP" includes but is not limited to a base station, a Node-B, a site controller, or any other type of interfacing device in a wireless environment.

The features of the present invention may be incorporated into an integrated circuit (IC) or be configured in a circuit comprising a multitude of interconnecting components.

Figure 1:
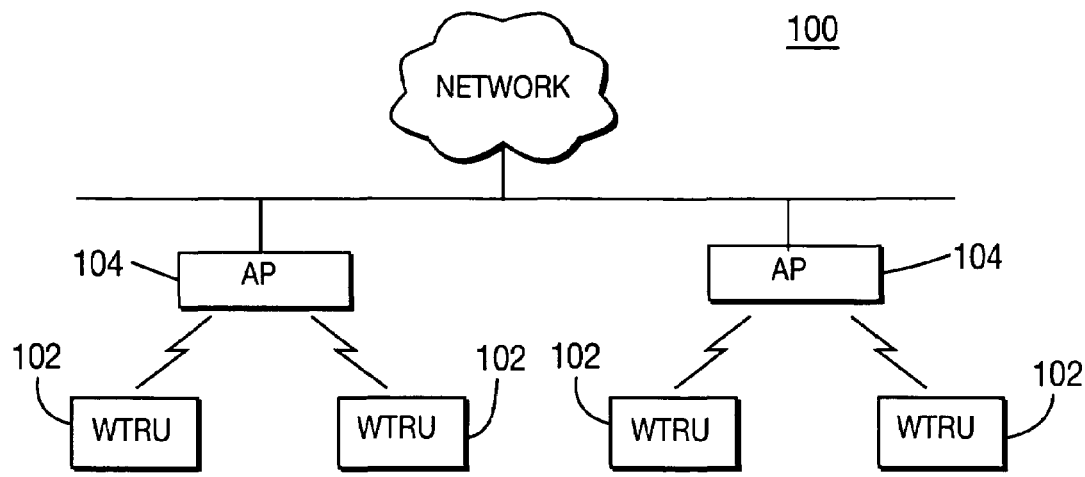
FIG. 1 is a block diagram of a wireless communication system including a plurality of APs and WTRUs operating in accordance with the present invention.

FIG. 1 is a block diagram of a wireless communication system 100 operating in accordance with the present invention. The system 100 includes a plurality of APs 104 and WTRUs 102. The APs 104 periodically transmit beacon messages which carry a plurality of wireless communication parameters. WTRUs 102 receive the beacon messages and attempt to associate with a selected one of the APs 104. Typically, the selected AP has the strongest beacon signal. Each AP 104 maintains a table of WTRUs 102 with which the AP 104 is associated. The AP table is updated either periodically or non-periodically.

Figure 2:
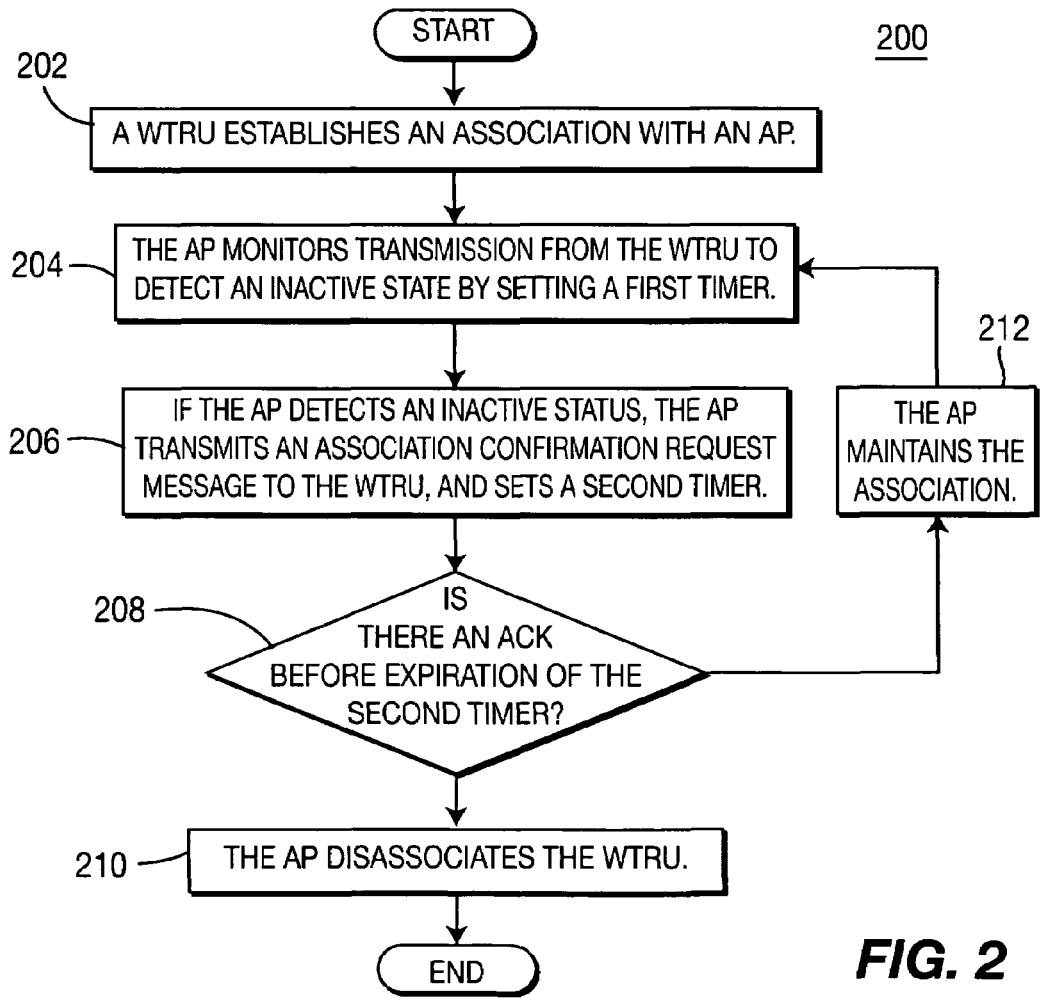
FIG. 2 is a flowchart of a process for managing the association and disassociation of the WTRUs of FIG. 1.

FIG. 2 is a flowchart of a process 200 including method steps for managing the association and disassociation of a WTRU 102 in accordance with a first embodiment of the present invention. In step 202, a WTRU 102 establishes an association with an AP 104.

The AP 104 monitors transmissions from the WTRU 102 to detect an inactive status of the WTRU (step 204). The inactive status is preferably determined by setting a timer. The AP sets the timer every time the AP receives a transmission from the WTRU. The inactive status is detected when the timer expires without receiving any transmissions from the WTRU.

If the AP 104 detects an inactivity of a WTRU 102, the AP 104 transmits an association confirmation request message to the WTRU 102 (step 206). At the same time the AP 104 sets a timer for an ACK from the WTRU 102. Upon receipt of the association confirmation request message, the WTRU 102 should respond with an ACK in order to maintain an association with the AP 104. The AP 104 determines whether an ACK is received before expiration of the timer (step 208). If the AP 104 does not receive an ACK until the expiration of the timer, the AP 104 disassociates the WTRU 102 (step 210). If the AP 104 receives an ACK before the timer expires, the association with the WTRU 102 is maintained (step 212). After the AP 104 receives an ACK from the WTRU 102, the process 200 returns to step 204 to continue to monitor the status of the WTRU 102.

Figure 3:
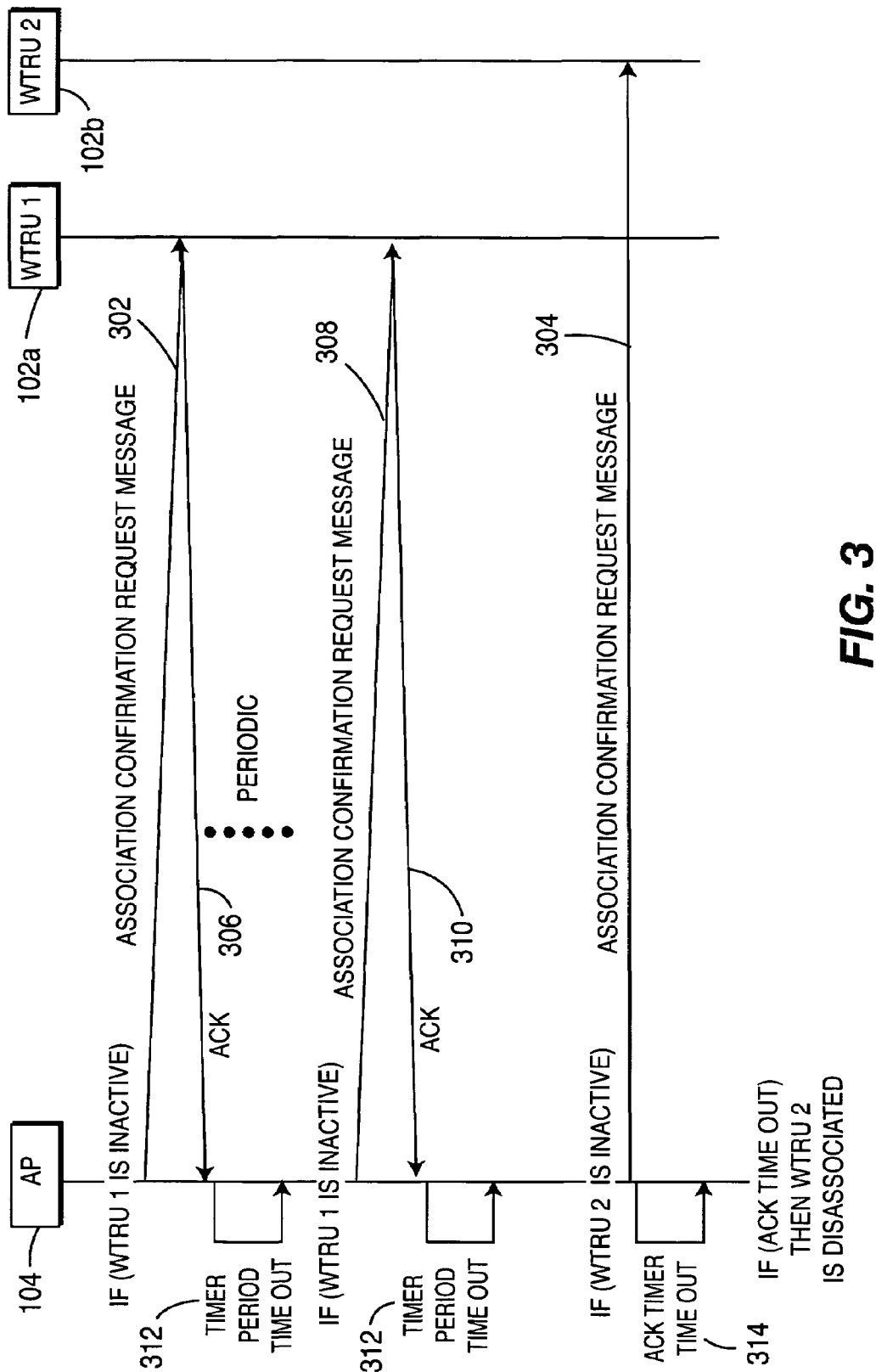
FIG. 3 is a signal flow diagram showing the exchange of messages between the APs and WTRUs of the system of FIG. 1.

FIG. 3 is a signal flow diagram showing the exchange of messages between an AP 104 and WTRUs 102*a*, 102*b*. In FIG. 3, both WTRU 102*a* and WTRU 102*b* have been previously associated with the AP 104, but both WTRU 102*a* and WTRU 102*b* are currently inactive. After detecting that WTRU 102*a* and WTRU 102*b* are inactive, the AP 104 transmits association confirmation request messages 302, 304 to WTRU 102*a* and WTRU 102*b* and sets timers 312, 314 for WTRU 102*a* and WTRU 102*b*, respectively. WTRU 102*a* remains in a coverage area of the AP 104 and desires to remain associated with the AP 104. However, WTRU 102*b* currently does not need to be associated with the AP 104, or may not be able to receive the association confirmation request message 304. Therefore, WTRU 102*a* transmits an ACK 306 to the AP 104 before the expiration of the timer 312. However, the AP 104 fails to receive an ACK from WTRU 102*b* before expiration of the timer 314 set for WTRU 102*b*. The AP 104 then disassociates WTRU 102*b* and frees up radio resources previously dedicated to WTRU 102*b*. The AP 104 further sets a timer 312 which tracks the amount of time since the AP 104 receives an ACK 306 from WTRU 102*a*. If the AP 104 determines that WTRU 102*a* is still inactive after a predetermined time period has passed, the AP 104 transmits another association confirmation request message 308 to WTRU 102*a*. The AP 104 receives another ACK 310 from WTRU 102*a*, and maintains an association with WTRU 102*a*.

Figure 4:
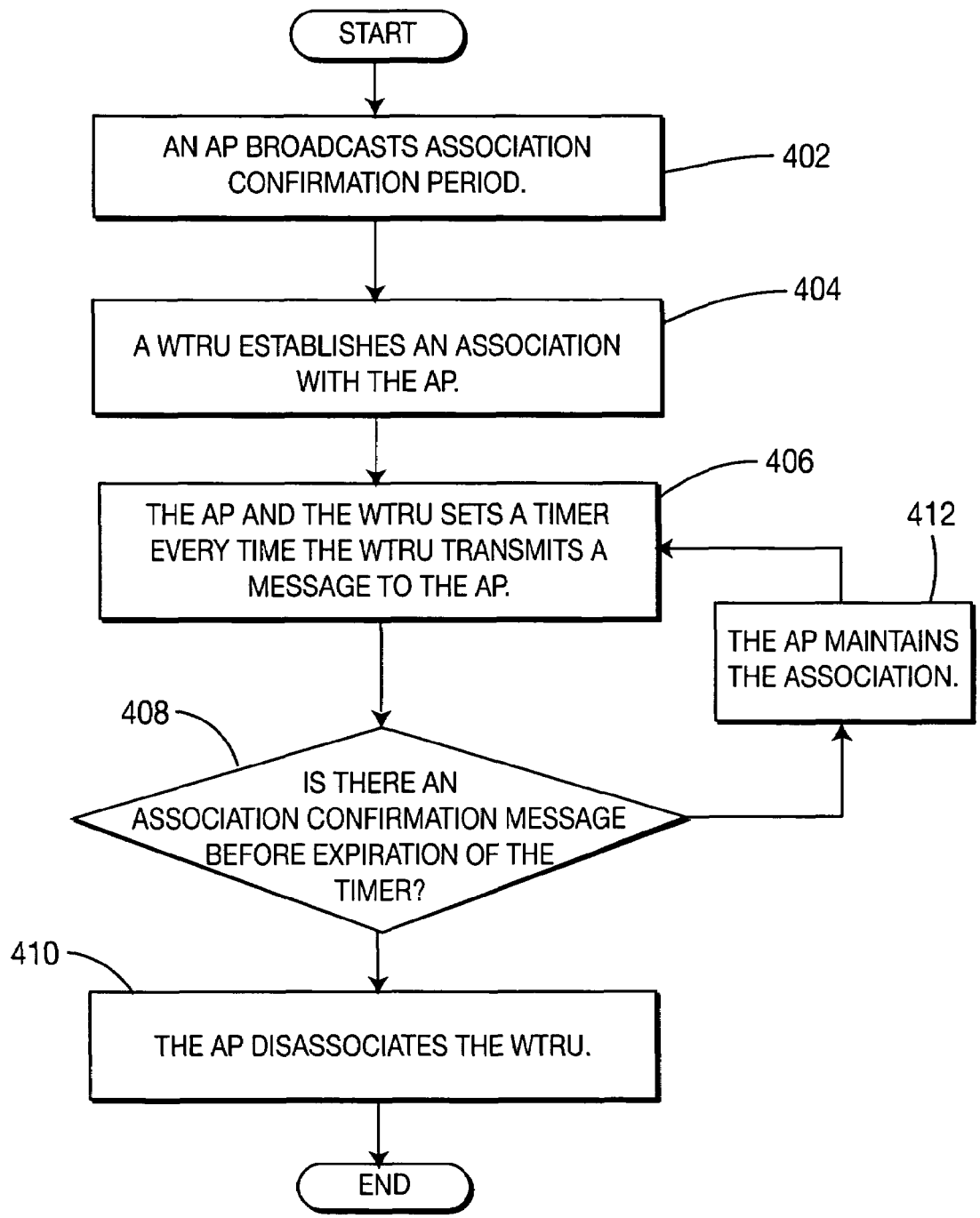
FIG. 4 is a flowchart of a process for managing the association and disassociation of the WTRUs in accordance with an alternate embodiment of the present invention.

FIG. 4 is a flowchart of a process 400 including method steps for managing an association and disassociation of a WTRU 102 in accordance with an alternate embodiment of the present invention. In step 402, an AP 104 broadcasts an association confirmation period preferably via a beacon channel. The WTRUs 102 served by the AP 104 receive a beacon message including the association confirmation period via the beacon channel, and store the association confirmation period in a management information base (MIB) of the WTRU 102. Whenever the WTRU 102 becomes inactive, the WTRU 102 should transmit an association confirmation message to the AP 104 at every association confirmation period.

Referring still to FIG. 4, the WTRUs 102 establish an association with the AP 104 (step 404). As mentioned above, the AP 104 monitors the transmission status of each WTRU 102 to determine whether the WTRUs 102 are active or not. Therefore, in this embodiment, every time a WTRU transmits a message to the AP 104, the AP 104 and the WTRU set a timer (step 406). In order to maintain the association, the WTRU must transmit an association confirmation message before the expiration of the timer. The AP 104 determines whether there is an association confirmation message from the WTRU in step 408. If the AP 104 does not receive an association confirmation message before the timer expires, the AP 104 disassociates the WTRU (step 410). If the AP 104 receives an association confirmation message before expiration of the timer, the AP 104 maintains the association with WTRU (step 412) and the process returns to step 406.

Figure 5:
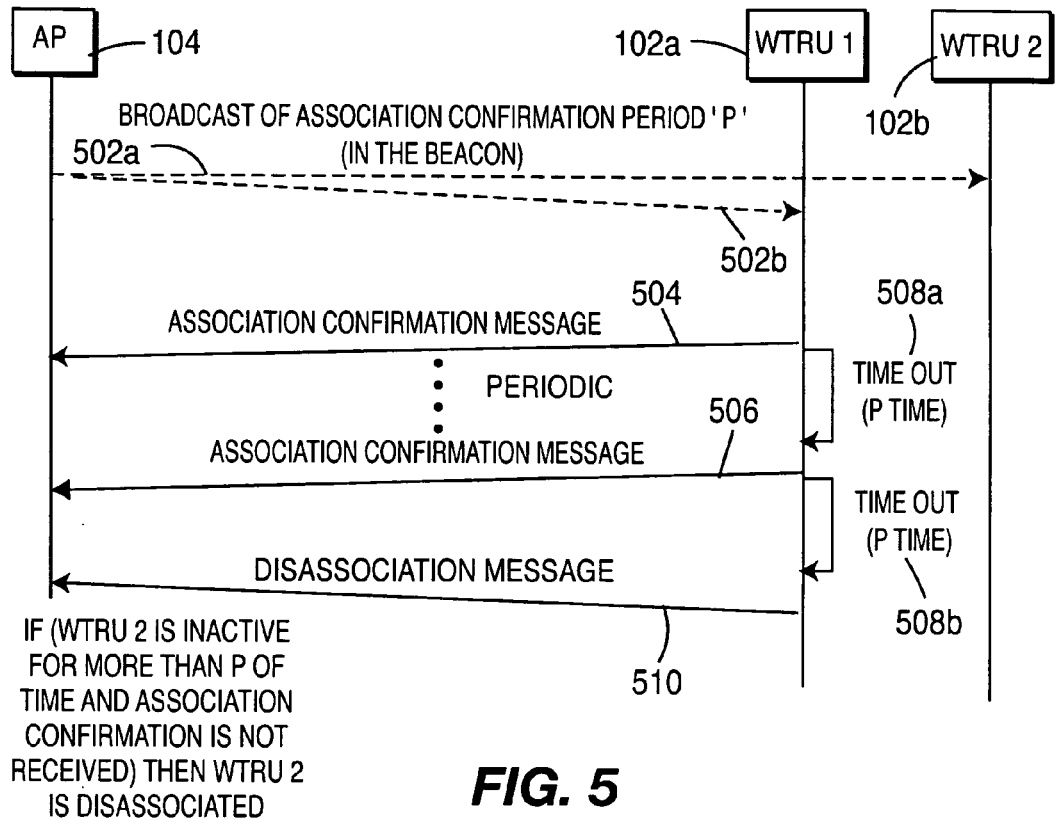
FIG. 5 is a signal flow diagram showing the exchange of messages between an AP and WTRUs in accordance with the alternate embodiment of the present invention.

FIG. 5 is a signal flow diagram illustrating an exchange of messages between an AP 104 and WTRUs 102*a*, 102*b* in accordance with an alternate embodiment of the present invention. The AP 104 broadcasts an association confirmation period, P, which is preferably included in a beacon message 502*a*, 502*b*. WTRU 102*a* and WTRU 102*b* are currently in association with the AP 104, but are inactive. Both WTRU 102*a* and WTRU 102*b* receive the beacon messages 502*a*, 502*b* and set the association confirmation period in a management information base (MIB) of each WTRU 102*a*, 102*b*. The AP 104 and the WTRUs 102*a*, 102*b* set timer 508*a*.

WTRU 102*a* remains in a coverage area of the AP 104 and desires to remain associated with the AP 104. However, WTRU 102*b* currently does not need to be associated with the AP 104. Therefore, WTRU 102*a* transmits an association confirmation message 504 to the AP 104 before the expiration of the timer 508*a*, but WTRU 102*b* does not. Upon receipt of the association confirmation message 504, the AP sets the timer 508*b*. However, as mentioned, the AP 104 fails to receive an association confirmation message from WTRU 102*b* before expiration of the timer 508*a*. The AP 104 then disassociates WTRU 102*b* and frees up radio resources dedicated to the WTRU 102*b*. If WTRU 102*a* remains inactive, WTRU 102*a* should periodically transmit association confirmation messages 506 prior to the expiration of each messages respective timer 508*b*. As long as the AP 104 receives periodic association confirmation messages 506 from WTRU 102*a*, the AP 104 maintains association with WTRU 102*a* despite WTRU 102*a* being inactive.

A WTRU 102 preferably transmits a disassociation message 510 whenever WTRU 102*a* is in a situation where WTRU 102*a* no longer needs an association with the AP 104, such as where WTRU 102*s* leaves a coverage area provided by the AP 104, associates with another AP 104, or its power is turned off. The transmission of the disassociation message 510 is preferably a mandatory message. Once the AP 104 receives a disassociation message 510, the AP 104 disassociates WTRU 102*a* and frees radio resources dedicated to WTRU 102*a*.

Figure 6:
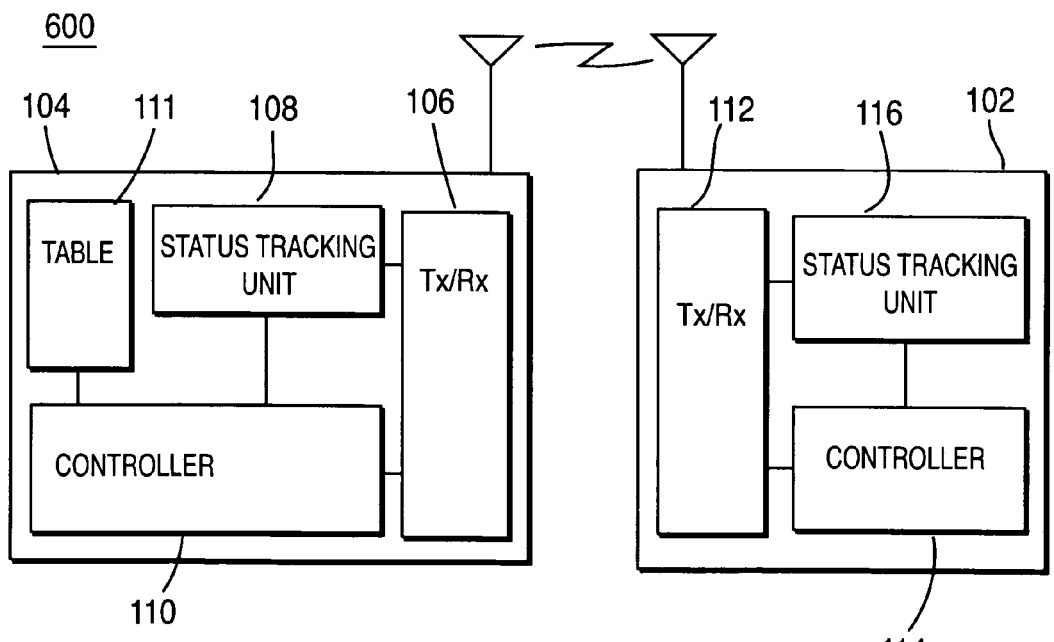
FIG. 6 is a block diagram of a system for managing an association and disassociation of a WTRU in accordance with the present invention.

FIG. 6 is a block diagram of a system 600 for managing an association and disassociation of a WTRU 102 in accordance with the present invention. The system 600 comprises an AP 104 and a WTRU 102. The AP 104 includes a transceiver 106, a status tracking unit 108 and a controller 110. The WTRU 102 includes a transceiver 112 and a controller 114. The transceiver 106 in the AP 104 transmits and receives messages to and from WTRUs 102. The status tracking unit 108 tracks an association status and an active status of each WTRU 102 with which the AP 104 is associated. The AP 104 maintains a WTRU table of WTRUs 102 with which the AP 104 is associated in a memory 111. When a new WTRU 102 is associated with the AP 104 or an existing WTRU 102 is disassociated, the AP 104 updates the WTRU table in the memory 111 accordingly. The status tracking unit 108 constantly monitors transmissions from associated WTRUs 102 and determines whether a WTRU 102 is active or not. No transmission of data for a predetermined period of time is treated as an inactive state. If an inactive state is detected, the controller 110 of the AP 104 transmits an association confirmation request message to the WTRU 102. The controller 110 also determines whether an ACK has been received from the WTRU 102. If not, the controller 110 removes the WTRU 102 from the WTRU table in the memory 111. The transceiver 112 of the WTRU 102 transmits and receives messages to and from the AP 104. The controller 114 controls the overall procedure in obtaining and maintaining an association and disassociation with the AP 104. If the WTRU 102 receives an association confirmation request message from the AP 104, and if the WTRU 102 still desires to be associated with the AP 104, the controller 114 transmits an ACK to the AP 104.

In one embodiment, the controller 110 of the AP 104 broadcasts an association confirmation period in a beacon message, and the WTRU 102 further includes a status tracking unit 116. Once the WTRU 102 becomes inactive, if the AP 104 does not receive an association confirmation message from the WTRU 102 within the association confirmation period, the controller 110 removes the WTRU 102 from the WTRU table in the memory 111. The status tracking unit 116 of the WTRU 102 determines a status of the WTRU 102 by monitoring transmissions from the WTRU 102. If the status tracking unit 116 determines that the association confirmation period will expire since the last transmission from the WTRU 102, the controller 116 transmits an association confirmation message to the AP 104 every association confirmation period which is broadcast via a beacon channel where WTRU 102 wishes to remain associated with the AP 104.

In another embodiment, whenever the WTRU 102 decides that the WTRU 102 does not need to maintain an association with the AP 104, the controller 114 transmits a disassociation message to the AP 104. When the AP receives the disassociation message from the WTRU 102, the controller 110 of the AP 104 disassociates the WTRU 102.

Although the features and elements of the present invention are described in the preferred embodiments in particular combinations, each feature or element can be used alone without the other features and elements of the preferred embodiments or in various combinations with or without other features and elements of the present invention.

What is claimed is:

1. In a wireless communication system including at least one wireless transmit/receive unit (WTRU) and at least one access point (AP), a method for managing an association and disassociation of the WTRU which is associated with the AP comprising:
    (a) broadcasting an association confirmation period message by an AP, wherein the association confirmation period message includes timing information of when the AP expects to receive an association confirmation message from WTRUs desiring to maintain an association with the AP;
    (b) receiving the broadcasted association confirmation period message at a WTRU;
    (c) storing the association confirmation period in a management information base (MIB) of the WTRU;
    (d) transmitting an association confirmation message from the WTRU to the AP, one message during each association confirmation period as stored in the WTRU's MIB, when the WTRU is in an idle mode and desires to maintain an association with the AP; and
    (e) disassociating the WTRU at the AP if the AP does not receive an association confirmation message from the WTRU within the association confirmation period.

2. The method of claim 1 wherein the association confirmation period message is broadcast a single time via a beacon channel.

3. The method of claim 1, further comprising:
    determining at the WTRU whether to maintain an association with AP; and
    transmitting from the WTRU to the AP a disassociation message when the WTRU determines it will not maintain an association with the AP.

4. An access point (AP) for managing an association and disassociation of at least one wireless transmit/receive unit (WTRU), the AP comprising:
    a status tracking unit configured to detect an inactive state of a WTRU with respect to the AP by determining whether any data has been transmitted from the WTRU to the AP during a predetermined time period;
    a transmitter for broadcasting an association confirmation period message, wherein the association confirmation period message includes timing information of when the AP expects to receive an association confirmation message from WTRUs desiring to maintain an association with the AP; and
    a controller configured to disassociate the WTRU if the AP does not receive an association confirmation message during each successive association confirmation period from the WTRU;
    wherein the WTRU transmits an association confirmation message to the AP, one message during every association confirmation period as stored in the WTRU's MIB, when the WTRU is in an idle mode and desires to maintain an association with the AP.

5. The AP of claim 4, wherein the association confirmation period message is broadcast a single time via a beacon channel.

6. The AP of claim 4, wherein the AP disassociates the WTRU when the AP receives from the WTRU a disassociation message requesting disassociation from the AP.

7. A wireless transmit/receive unit (WTRU) for managing an association and disassociation of the WTRU with an access point (AP), the WTRU comprising:
    a receiver for receiving an association confirmation period message from an AP, wherein the association confirmation period message includes timing information of when the AP expects to receive an association confirmation message from WTRUs desiring to maintain an association with the AP;
    a management information base (MIB) for storing the received association confirmation period;
    a status checking unit configured to detect an inactive state of the WTRU with respect to the access point (AP); and
    a controller configured to transmit an association confirmation message to the AP, one message during every association confirmation period as stored in the MIB, when the WTRU becomes inactive but desires to maintain an association with the AP.

8. The WTRU of claim 7, wherein the association confirmation period message is broadcast by the AP a single time via a beacon channel.

9. The WTRU of claim 7, wherein the controller is further configured to determine if the WTRU desires to maintain an association with the AP.

10. The WTRU of claim 9, wherein the controller is further configured to transmit a disassociation message to the AP requesting disassociation from the AP, and the AP disassociates the WTRU upon receiving the disassociation message.

* * * * *

UNITED STATES PATENT AND TRADEMARK OFFICE
CERTIFICATE OF CORRECTION

PATENT NO.         : 7,197,015 B2                                            Page 1 of 1
APPLICATION NO.    : 10/985499
DATED              : March 27, 2007
INVENTOR(S)        : Athmane Touag It is certified that error appears in the above-identified patent and that said Letters Patent is hereby corrected as shown below:

At sheet 1, FIG. 2, element 208 asks a question, therefore right output requires a YES notation and bottom output requires a NO notation.

At sheet 3, FIG. 4, element 406, line 1, after the word WTRU, delete "SETS" and insert therefor --SET--.

At sheet 3, FIG. 4, element 408 asks a question, therefore right output requires a YES notation and bottom requires a NO notation.

At column 1, line 44, after the word "applying", delete "a" and insert therefor --an--.

At column 3, line 38, after "AP 104", delete "receives" and insert therefor --received--.

At column 4, line 33, before the word "respective", delete "messages" and insert therefor --message's--.

At column 4, line 40, before the word "leaves", delete "102s." and insert therefor --102a--.

Signed and Sealed this

Twenty-fifth Day of December, 2007

JON W. DUDAS
*Director of the United States Patent and Trademark Office*